June 30, 1936. J. W. SWENDSEN 2,045,734
INDUCTION MOTOR WITH DISK WOUND STATOR AND ROTOR
Filed Jan. 28, 1935
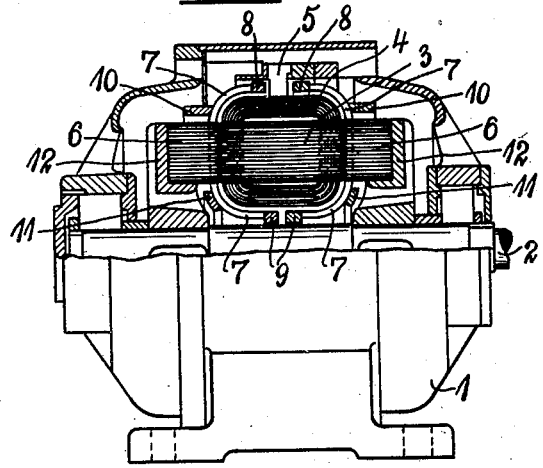
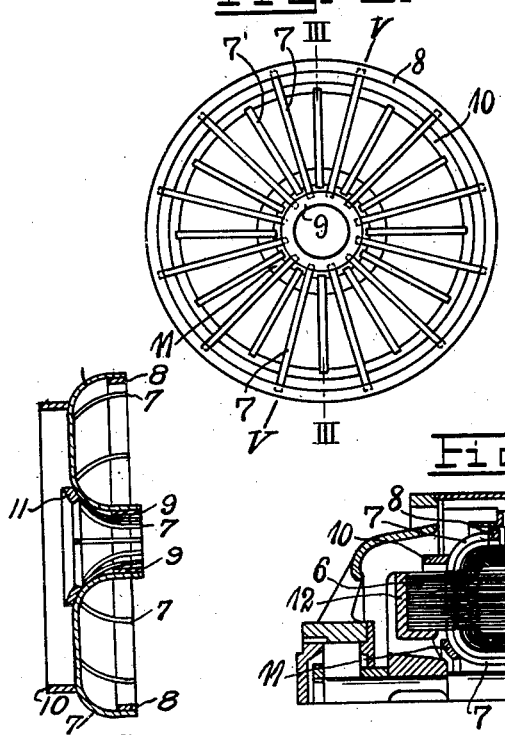
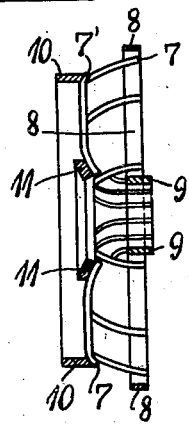
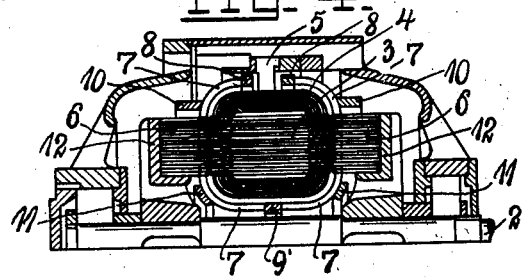
J. W. Swendsen
INVENTOR
By Glascock, Downing & Seebold
Attys.

Patented June 30, 1936

2,045,734

UNITED STATES PATENT OFFICE 2,045,734

INDUCTION MOTOR WITH DISK-WOUND STATOR AND ROTOR

Johan Walfred Swendsen, Oslo, Norway

Application January 28, 1935, Serial No. 3,837
In Norway December 4, 1933

6 Claims. (Cl. 172—129)

The invention relates to an induction motor with disk-wound stator with ring winding and provided on either side of the stator with a disk wound rotor having a separate short-circuit winding for each rotor part or a combined short-circuit winding for both rotor parts.

In this kind of motor, heretofore the short-circuiting bars have been allowed to project from the rotor laminations and they have been provided with short-circuiting rings. In addition, the short-circuiting bars have been carried outside the rotor laminations and bent towards each other in respect of the two rotor halves, so that the short-circuiting rings at the ends of the bent bars of the two rotor halves lay as closely as possible to each other. In the case of the first of these methods, however, the part of the short-circuit reactance, which originates from the stator windings outside the slots or the laminations and the rotor short-circuiting rings is large, so that cos φ and/or the possibility of carrying an overload is small, while in the case of the last device, the short-circuit reactance is very small, because a large part of the stator winding fields is induced in the rotor winding, so that cos φ and the possibility of carrying an overload are large. In the case of the last device, however, the weight and loss in the rotor winding are comparatively great, on account of the considerably increased length of the bars.

The object of the invention is to increase the advantageous properties of a ring-wound motor by combining these two known forms of construction for ring-wound motors, and to provide a short-circuiting ring both near the iron and also at the end of the bent bars. The two above-mentioned disadvantages are thereby obviated. It is possible, for example, to give the rings the same total diameter as heretofore, while at the same time the portion of the bars which lies outside the rotor laminations is given a smaller total diameter than the portion of the bars lying within the rotor laminations. In comparison with the device having bent bars and a single short-circuiting ring on either side, copper is thereby saved, the copper loss being reduced at the same time, since the outer parts of the winding carry only a small part of the total current. The part of the short-circuit reactance originating from the stator winding outside the laminations is still small, because a large part of its lines of force also now act inductively upon the rotor winding.

This difference in the total diameter of the bars within the rotor laminations and the bars outside the rotor laminations may be varied in different ways. Thus, for example, in the case of a cast rotor winding, the diameter of the bars outside the laminations may be diminished by reducing the number of bars in proportion to the number of bars inside the laminations, or by reducing the diameter of the bars, while at the same time the number of the bars outside and inside the laminations remains the same. If the bars or rings are welded or soldered together, some of the bars may advantageously be allowed to terminate at the ring near the iron and some are carried to the rings on the end of the U-shaped bars; or it is possible, in each slot, to insert two bars of suitable diameter, and to carry one, normally that in the vicinity of the air-gap, to the rings situated remote from the iron, and to carry the other only to the rings which lie nearest the iron.

In order to carry out the invention, it is of course not necessary for the construction of the short-circuit winding of the rotor parts on the periphery of the rotor laminations to agree with that on the inside of the rotor laminations, since in many cases the ordinary previously known method may advantageously be employed on the inside of the rotor laminations, that is to say, either the rotor bars are allowed to terminate directly on the outside of the laminations and are connected there with short-circuiting rings, or they are carried in a curve along the inside of the stator and are connected with short-circuiting rings at the end of the projecting curved bars, or the individual bars in one rotor half may be electrically connected with the corresponding bars in the other rotor half, and finally, also in the last mentioned form of construction, a common short-circuiting ring for both rotor halves may be provided on the inside of the stator. Finally, as will be seen, any one of these combinations may be employed according to the particular use for which the motor has been constructed.

The reduction of the bar diameter outside the rotor laminations in proportion to the bars inside the rotor laminations may be employed on the inside of the rotors, also where the individual bars of both rotors are electrically connected together, when short-circuiting rings near the iron are employed.

By means of these devices, it is also possible, by varying the ratio between the resistance in the sort-circuiting ring near the iron and the sum of the resistance of the short-circuiting ring which is remote from the iron and the bars between these short-circuiting rings, to obtain different motor characteristics corresponding to the known motors with both short-circuit windings. This effect may be increased by providing in the manner known per se, magnetic material around the short-circuiting ring situated nearest the iron, or, on each rotor, short-circuit windings may be provided, one near the air-gap having bent bars and one having the short-circuiting rings on the outer ends of the bars, and another remote from the air-gap having the short-circuiting rings near the iron. At the same time, the interval between these two windings in the rotor iron is partly filled with magnetic material, in the same way as is known in the case of ordinary double slot rotors.

To explain the invention, it will be described hereinafter with reference to the drawing which show forms of construction thereof.

In the drawing, Figures 1, 2, and 3 show a preferred form of construction of a ring-wound motor according to the invention.

Figure 1 shows the motor partly in longitudinal section seen from the side.

Figure 2 shows a rotor winding seen from the central plane of the motor and in the axial direction.

Figure 3 shows a section through Figure 2 along the line III—III.

Figure 4 shows a section corresponding to Figure 1 through another form of construction of the motor, according to the invention.

Fig. 5 is a section on the line V—V of Fig. 2.

In Figures 1 and 4, 1 is the motor casing and 2 is the motor shaft, which is suitably journalled in the motor casing 1. There is also provided in the motor casing a stator comprising an iron core 3 wound in ring form from a long band of laminations and provided with ordinary copper windings 4. The stator 3, 4 is fixed to the motor casing 1 by means of suitable lugs 5. On either side of the stator 3 are provided rotor elements comprising iron cores 6 carried by flanges 12 fixed to the shaft 2. In the same way as the stator core 3, the iron cores 6 are wound from a long band of laminations, and are provided in the usual manner with radially extending slots for receiving the short-circuit winding. The short-circuit winding (Figures 2 and 3) comprises bars 7 extending radially and normally bent U-shaped, and further, according to the invention, radially extending, shorter bars 7', both passing through the core 6, short-circuiting rings 8 and 9 being provided, which connect the outermost ends of the U-shaped bars 7, and furthermore short-circuiting rings 10 and 11, which connect together both the U-shaped bars 7 and the shorter bars 7'. The short-circuiting rings 10 and 11 are provided as close as possible to the laminations of the rotor.

In the form of construction shown here, the rotor windings are practically close against the outside and inside of the stator. According to the general description, however, the device may be modified to a considerable extent, without departing from the idea of the invention, in that it is possible for example, on the inside of the rotors, to provide only one of the short-circuiting rings 9 or 11, whereby in the latter case the short-circuiting bars are allowed to terminate at the rings 11.

Both the form and construction of the above-mentioned short-circuit windings in the form employed in Figure 1 follow from Figures 2 and 3 without more detailed description.

Figure 4 shows an example of the application of the invention to a short-circuit motor having two rotor elements on either side of a ring-wound stator, and in which the individual rotor bars are connected together electrically on the inside of the stator, that is to say, the side of the stator which faces rotor shaft. This may be effected either by means of a short-circuiting ring 9', or each bar may be connected individually with each corresponding bar of the other rotor half.

At the same time, the number of short-circuiting bars 7 connecting one rotor half with the other may be smaller than the number of short-circuiting bars passing through the rotor laminations, if the short-circuiting rings 9 are employed; or the total diameter of the rotor bars between the two rotor halves may, under the same assumption, advantageously be smaller than the total diameter in the laminations.

In other respects, the references in Figures 4 and 1 correspond to each other.

I claim:

1. An induction motor comprising a stator having field coils and a rotor having short circuited bars carried thereby said bars having at their ends short circuiting rings thereon encircling the ends of the field coils, and a short circuiting ring adjacent one end of the said bars the total cross section of the said bars between the last mentioned ring and the adjacent end of the bars being smaller than the total cross section of the bars on the other side of the said ring.

2. An induction motor comprising a stator having field coils and a rotor having short circuited bars carried thereby, said bars having at their ends short circuiting rings thereon encircling the ends of the field coils, a short circuiting ring at a short distance from one end of the said bars, and additional short circuit bars extending to the latter short circuiting ring only.

3. An induction motor comprising a stator having field coils and an iron core rotor having short circuited bars passing through the said iron core and extending beyond the outside surface of same, said bars having at their ends short circuiting rings thereon encircling the ends of the field coils, a short circuiting ring arranged close to the said core, and additional short circuiting bars arranged in the said core and extending only to the said ring close to the outside surface of the said core.

4. An induction motor comprising a stator having field coils and an iron core rotor having short circuited bars passing through the said iron core and extending beyond the outside surface of same, said bars having at their ends short circuiting rings thereon encircling the ends of the field coils, and a short circuiting ring arranged close to the said core, the cross sectional area of each of the said bars being reduced over that part of same that extends between the two last mentioned rings and outside the iron core.

5. An induction motor comprising a stator having field coils and an iron core rotor having short circuited bars passing through the said iron core and extending beyond the outside surface of same, said bars having at their ends short circuiting rings thereon encircling the ends of the field coils, a short circuiting ring arranged close to the said core, and additional short circuiting bars being arranged in the said core and extending only to the said ring close to the outside surface of the said core, the last mentioned bars being located in the said core parallel to and directly under the said first mentioned bars.

6. An induction motor with short-circuited secondary, comprising strip wound magnet elements arranged with one stator between two rotor elements, substantially U-shaped, secondary conductor bars arranged with one leg on each side of the stator, and with the ends projecting out of the periphery of the rotor elements, short-circuiting rings connecting the bars with each other on each side of the stator, and short-circuiting rings connecting the bars with each other adjacent the periphery of the rotor elements, and short-circuiting rings connecting the bars with each other on the inside of the rotor elements, the total cross sectional area of the bars connecting the rings on the inside of the rotor element with each other being less than the total cross sectional area of the bars in each of the rotor elements.

JOHAN WALFRED SWENDSEN.